(12) United States Patent
Accomazzi et al.

(10) Patent No.: US 7,596,267 B2
(45) Date of Patent: Sep. 29, 2009

(54) IMAGE REGION SEGMENTATION SYSTEM AND METHOD

(75) Inventors: Vittorio Accomazzi, Ontario (CA); Renee Lazarowich, Ottawa (CA); Christopher J. Barlow, Rockwood (CA); Bruce Davey, Mississauga (CA)

(73) Assignee: Cedara Software Corp., Mississauga, Ontario (CA)

( * ) Notice: Subject to any disclaimer, the term of this patent is extended or adjusted under 35 U.S.C. 154(b) by 775 days.

(21) Appl. No.: 10/788,481

(22) Filed: Mar. 1, 2004

(65) Prior Publication Data

US 2005/0031202 A1 Feb. 10, 2005

Related U.S. Application Data

(60) Provisional application No. 60/450,975, filed on Feb. 28, 2003.

(51) Int. Cl.
*G06K 9/00* (2006.01)
(52) U.S. Cl. .................................................. 382/173
(58) Field of Classification Search ................. 382/173
See application file for complete search history.

(56) References Cited

U.S. PATENT DOCUMENTS

| | | | |
|---|---|---|---|
| 5,812,691 A | 9/1998 | Udupa et al. | |
| 5,903,664 A * | 5/1999 | Hartley et al. | 382/154 |
| 5,920,319 A | 7/1999 | Ahn et al. | |
| 6,112,112 A | 8/2000 | Giger et al. | |
| 6,175,655 B1 * | 1/2001 | George et al. | 382/257 |
| 6,345,112 B1 | 2/2002 | Malley et al. | |
| 6,754,376 B1 * | 6/2004 | Turek et al. | 382/131 |
| 2003/0144598 A1 * | 7/2003 | Zhang et al. | 600/529 |

OTHER PUBLICATIONS

Dellepiane, The Active Role of 2-D and 3-D Images: Semi-Automatic Segmentation, in Contemporary Perspectives in Three-Dimensional Biomedical Imaging, Technology and Informatics, 1997, pp. 165-190, vol. 30, IOS Press.

Dellepiane and Fonta, Extraction of Intensity Connectedness for Image Processing, Pattern Recognition Letters, 1995, pp. 313-324, vol. 16, Elselvier Science B.V.

Dellepiane, et al., Model Generation and Model Matching of Real Images by a Fuzzy Approach, Pattern Recognition, 1992, pp. 115-137, vol. 25, No. 2, Pergamon Press.

Dellepiane, et al., Nonlinear Image Labeling for Multivalued Segmentation, IIEE Transactions on Image Processing, Mar. 1996, pp. 429-446, vol. 5, No. 3.

Dellepiane and Giorgini, Fuzzy Segmentation of Magnetic Resonance Images, in Biomedical Imaging IV, Proceedings of the 4$^{th}$ IEEE EMBS International Summer School on Biomedical Imaging, Berder Island, France, Jun. 17-24, 2000, Section 5.4.

(Continued)

*Primary Examiner*—Vikkram Bali
*Assistant Examiner*—Eueng-Nan Yeh
(74) *Attorney, Agent, or Firm*—Michael Best & Friedrich LLP (57) ABSTRACT

The invention relates to a method of segmenting an image of a structure stored as a set of spatially related data points representing variations in a predetermined parameter, said method comprising the steps of selecting a seed point within the structure to be segmented, assigning to each of the data points a value of connectivity indicative of the confidence that respective areas of the data points are part of the same structure as said seed point, said value of connectivity including a function of the distance of the respective point from said seed point, establishing a threshold value for said level of connectivity and selecting for display data points meeting said threshold value.

30 Claims, 11 Drawing Sheets

OTHER PUBLICATIONS

Fontana, et al., The Application of Fuzzy Methods to Images Segmentation, in Fuzzy Logic and Soft Computing, Advances in Fuzzy Systems, Applications and Theory vol. 4, Nov. 1995, pp. 404-410, World Scientific.

Fontana, et al., Interactive Segmentation for Target Outline, in Medical Imaging, Analysis of Multimodality 2D/3D Images, Technology and Informatics, 1996, pp. 113-120, vol. 19, IOS Press.

Chamorro-Martinez, J., Sanchez, D., Prados-Suarez, B. "A Fuzzy Color Image Segmentation Applied to Robot Vision." VII Online World Conference on Soft Computing in Industrial Applications. 'Online! Sep. 26, 2002. pp. 1-6, XP002288132. Retrieved from the Internet <URL:http://decsai.ugr.es/WSC7/foro.php?SES=2&url=http://decsai.ugr.es/> 'Retrieved Jul. 13, 2004.

Philipp-Foliguet, S., et al. "Segmentation into fuzzy regions using topographic distance." 2001, Los Alamitos, CA, USA, IEEE Comput. Soc., USA, Oct. 15, 2001. pp. 282-288, XP002288133, ISBN: 0-7695-1330-1, pp. 282-286.

* cited by examiner

FIG. 17

IMAGE REGION SEGMENTATION SYSTEM AND METHOD

This application claims priority to U.S. Provisional Patent Application Ser. No. 60/450,975 filed on Feb. 28, 2003, the entire contents of which are incorporated herein by reference.

The present invention relates to the field of imaging and in particular to a system and method for segmenting certain subsets of images in order to isolate specific structures.

BACKGROUND OF THE INVENTION

In the field of imaging, and more particularly medical imaging, image region segmentation methods are used to isolate subsets of an image corresponding to specific objects such as an artery, the heart, kidneys or any other such anatomical structure. These images may be obtained by various means such as, for example, Magnetic Resonance Imaging (MRI), Computerized Tomography (CT) or any other such medical imaging system. Segmentation, or feature extraction, is an important requirement for any medical imaging application. When a radiologist or a physician looks at an image obtained from a medical imaging system, such as from an MRI, CT or any other similar system, he or she mentally isolates the structure relevant to the desired diagnosis. If the structure has to be measured or visualized by the computer, the radiologist or physician has to identify the structure on the original images using a computer and program.

There are two major classes of region segmentation methods. The first class of region segmentation methods is binary segmentation. Binary segmentation determines for every voxel in the image, using a specific property or function and threshold values, whether or not that point belongs to an anatomical structure. The second class of region segmentation methods, gray-level segmentation, determines for every voxel in the image, using a specific property or function, the "level of confidence" for which that point belongs to an anatomical structure.

Gray-level segmentation methods have the advantage of avoiding a priori knowledge of the threshold values by creating a "connectivity map" or membership that associates a level of confidence to each voxel, creating a number of solutions that depend on the minimal level of confidence desired. The user can then simply set the threshold for the minimal level of confidence of the voxels to be displayed and can interactively raise or lower the threshold according to the obtained image.

There are, however, situations in which current gray-level segmentation methods are not optimal. For instance, when trying to segment a large blood vessel, the algorithm will segment the vessel only partially and include some bone structure because its density is very close to the density of the large blood vessel. Furthermore, gray-level segmentation algorithms using fuzzy logic base the membership values purely on the density of the image voxels and the connectedness to the seed point. Accordingly, a voxel who's density is identical to the seed point and to which there is a direct path from the seed point, such as for example an Arterio-Venous Malformation, will have a very high membership value. This characteristic makes it difficult to properly segment the desired structure where distinct structures with similar densities exist.

It is the object of the present invention to provide a system and method which obviates or mitigates the abovementioned disadvantages.

In accordance with the invention, there is provided a method of segmenting an image of a structure stored as a set of spatially related data points representing variations in a predetermined parameter, said method comprising the steps of selecting a seed point within the structure to be segmented, assigning to each of the data points a value of connectivity indicative of the confidence that respective areas of the data points are part of the same structure as said seed point, said value of connectivity including a function of the distance of the respective point from said seed point, establishing a threshold value for said level of connectivity and selecting for display data points meeting said threshold value.

Embodiments of the invention will now be described by way of example only with reference to the accompanying drawings in which.

DETAILED DESCRIPTION OF THE INVENTION

Figure 1:
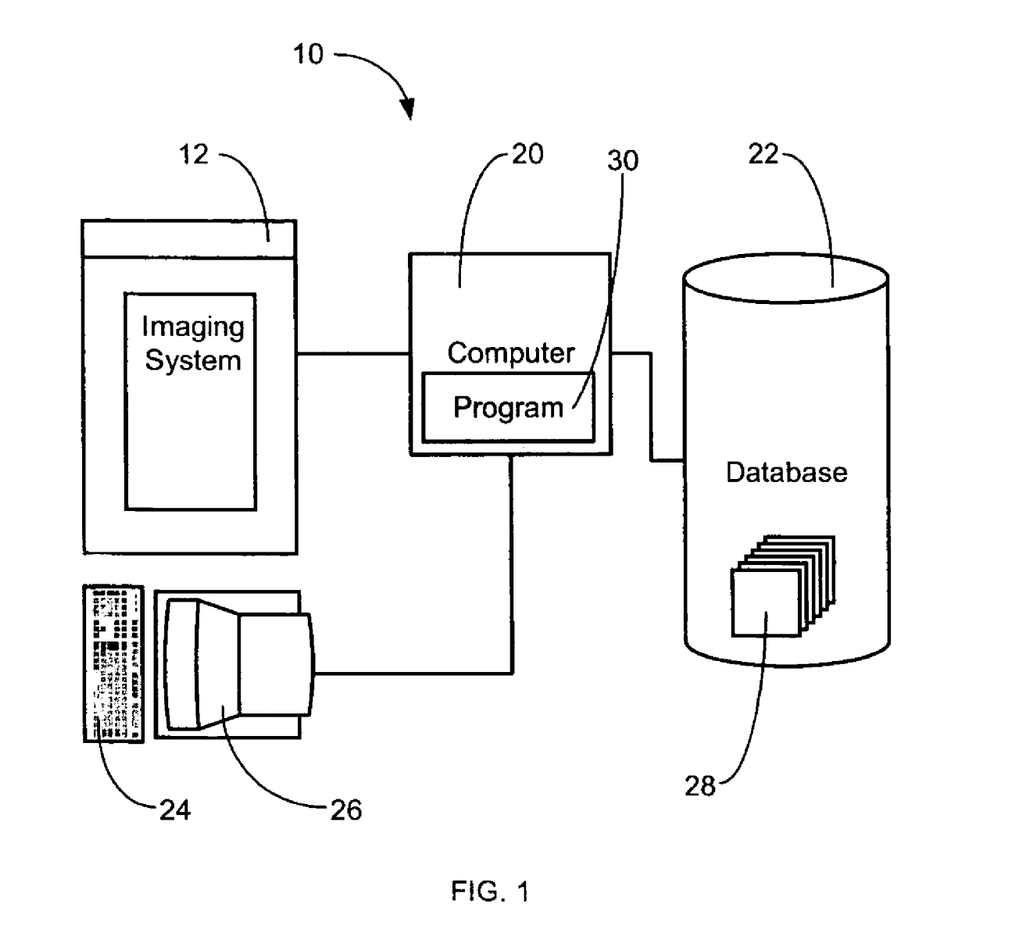
FIG. 1 is a schematic diagram depicting the components of an imaging system.

Referring to FIG. 1, a system for acquiring the image data of a subject, segmenting anatomical structures from the image data and displaying such structures, is indicated generally at numeral 10. Although the embodiment is described with reference to the segmentation of anatomical structures from images obtained by medical imaging systems, it may also be applied to the segmentation of other types of structures from images other than from such systems, such as from, for example, geological survey imaging systems.

Turning back to FIG. 1, the system 10 comprises a medical imaging system 12 to interrogate a patient and supply data to a computer 20 from which an image can be created. The data is stored as a set of spatially related data points representing variations in a predetermined parameter. Each data point will include information about one or more predetermined parameters than can be displayed to illustrate variations in the parameters. The predetermined parameter is typically the density of the anatomical structure being imaged and can be displayed as variations in color or gray scale. The computer 20 includes a program 30 for running on the computer, and to manipulate and display the data obtained from the imaging system. The program 30 comprises a set of machine readable instructions, which may be stored on a computer readable medium. Such a medium may include hardware and/or software such as, by way of example only, magnetic disks, magnetic tape, optically readable medium such as CD ROM's, and semi-conductor memory such as PCMCIA cards. In each case, the medium may take the form of a portable item such as a small disk, floppy diskette, cassette, or it may take the form of a relatively large or immobile item such as hard disk drive, solid state memory card, or RAM provided in the computer 20. It should be noted that the above listed example mediums can be used either alone or in combination.

The data and resultant images are stored on a database 22 and accessed via a user interface 24, such as a keyboard, mouse, or other suitable devices, for display on a display 26. If the display 26 is touch sensitive, then the display 26 itself can be employed as the user interface 24. Usually, during an imaging procedure, the medical imaging system 12 scans a patient, producing a series of cross-sectional images (or slices) of the patient's body. These cross-sectional images composed of pixels, each having a measurable predetermined parameter, for example, a density value, are then forwarded to the computer 20. The program 30 stacks the data in a three-dimensional array of voxels creating a three-dimensional image of the patient for viewing as a displayed image on display 26 and storing as a data-set 28 in the database 22. A voxel, or volume pixel, is spatial element defined as the smallest distinguishable part of a three-dimensional image. The user interface 24 provides facility for an operator to interact with the system, and more particularly, for selecting areas of the display image 26 for identifying structures to be processed or to set various parameters of the system.

The computer 20 uses program 30 to processes the data-set 28 to produce the required image in a manner, which is described in more detail below.

Figure 2:
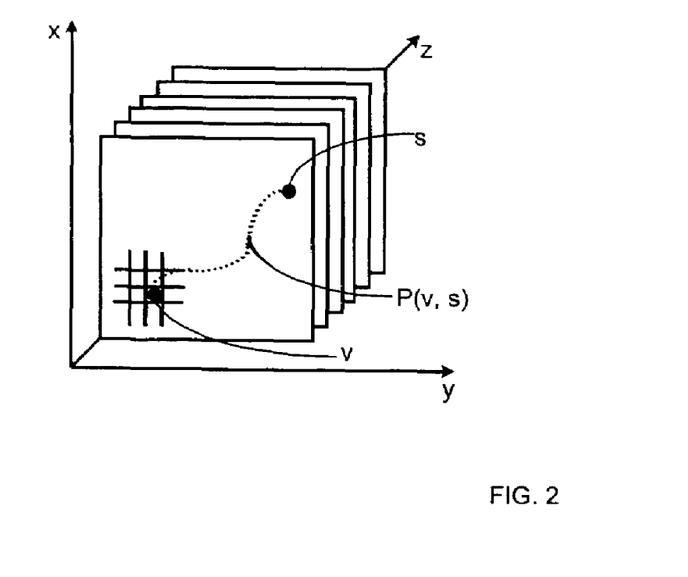
FIG. 2 is a schematic diagram depicting a stack of cross-sections forming a three-dimensional array of voxels.

As shown in FIG. 2, typically each image is comprised of a stack of cross-sectional images forming a three-dimensional array made up of individual voxels v, which is stored as a data-set 28 in the database 22. The program 30 includes a segmentation algorithm shown schematically in FIG. 3 which takes at block 102 the three-dimensional array as input and at block 104 selects one or more seed points, s, located in the structure of interest. The seed point s may be an individual voxel but more generally is an initial location selected in the data-set in a convenient manner. The initial locations are usually selected and entered into the system by the user using the user interface 24 to view the overall structure and select the area of interest. Alternatively, the initial location may be selected semi-automatically (in which there is minimal user interaction with the system) or even automatically (with no user interaction with the system) within the data-set that can be identified by computer processing employed on data representing the image. Such data may have characteristics that can be interpreted as a particular feature, for example data characteristic of a certain material type (for example bone in CT) or a boundary between two types of material, and thereby be used to select an initial location within the dataset without user intervention.

The initial location may also be selected from examination of other images or data-sets related in some manner (for example by correlation in space or time) to the one being examined which then permits the corresponding location to be identified on the image. Such images or data-sets could result from many sources, for example, from a different imaging modality (for example, a PET scan of the same patient correlated to a CT scan of that patient, or from MRI scan correlated to an Ultrasound dataset) or from an atlas (for example anatomical or functional) that has been related to the dataset. Such images or datasets do not need to be the same dimensionality as the dataset being segmented (for example, two projection X-rays could be employed to identify an initial location on a four-dimensional cardiac CT dataset).

The segmentation algorithm is not limited to three-dimensional data. It can be applied to any multi-modality (that is having a dimensionality greater than one) images or data-sets. For example a four-dimensional dataset can be segmented by a logical extension of the segmentation algorithm. The most usual method of such extension would be to consider the four-dimensional dataset as a collection of three-dimensional datasets (taking the fourth dimension as the index into this collection of three-dimensional datasets) to which the segmentation algorithm could directly apply. However, more generally, the segmentation algorithm would be modified to directly operate on all dimensions of the multi-dimensional dataset.

Figure 3:
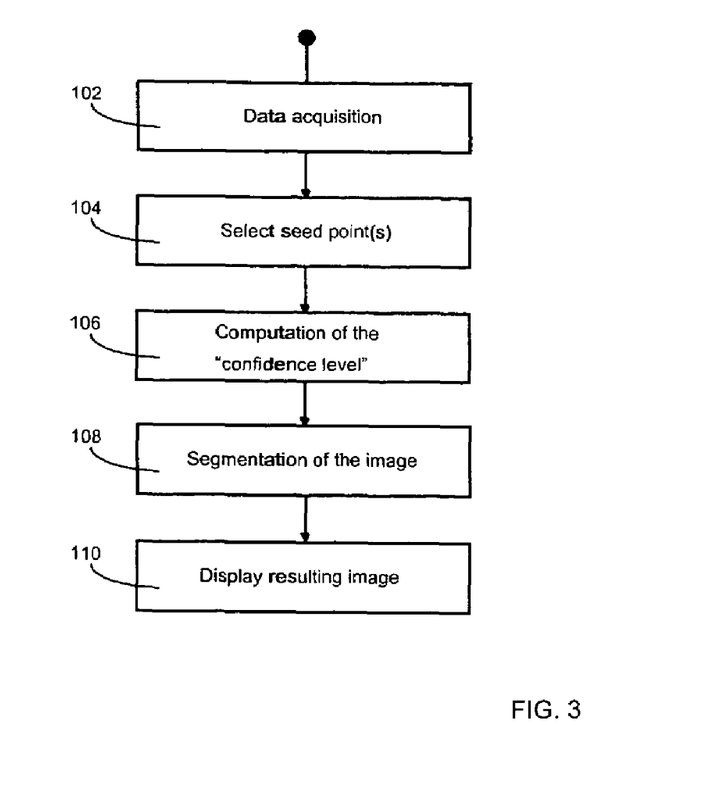
FIG. 3 illustrates a generalized flow chart of an image segmentation algorithm.

At block 106 or each voxel v in the array, the algorithm calculates the "level of confidence" with which this voxel belongs to the same structure identified by the seed points. The "confidence level" is defined as the connectivity from a specific voxel to a seed point, which is a function in the variation of the predetermined characteristic along a path P(v, s) from the seed point s to the voxel v. Accordingly a path P(v, s) is selected from the seed point s to the voxel v and the variation of predetermined characteristic for each voxel along that path determined. As will be described below, this variation is used to assign a value of connectivity to the voxel v. Once all the voxels in the data have an assigned value of connectivity, at block 108 the image may be segmented by selecting voxels with a required degree of connectivity, ie, a required level of confidence that the voxels belongs to the same structure as the seed point s. That level may be adjusted through interface 24 to refine the image which, at block 110. is displayed in display 26.

The connectivity may be determined in a number of different manners but a particularly beneficial one is to determine it mathematically using fuzzy logic concepts. If the characteristic function $\mu(v)$ over a fuzzy space, here the three-dimensional array of voxels v composing the image being segmented, assigns for the predetermined characteristic of each element v a real value ranging in the interval [0,1] and the path P(v, s) is a connected sequence of points from a voxel v to a voxel s, then the conventional fuzzy degree of connectedness C from v to s is expressed as follows:

$$C_\mu(v, s) = \max_{P(v, s)}[\min_{p \in P(v, s)} \mu(p)] \quad \text{Equation 1}$$

where $C_\mu(v, s)$ denotes the degree of connectedness, or connectivity, between v and s over characteristic function $\mu$ and P(v, s) is a path from v to S.

Thus the connectivity C is determined as the maximum of the minimum values of the predetermined characteristic in respective paths between the seed points and the voxel v.

Applying the classical fuzzy definition to a modified field with respect to a seed point s is results in:

$$X^s = 1 - |\eta(v) - \eta(s)| \quad \text{Equation 2}$$

where $(X^s = \{\chi^s(v)\})$ is the fuzzy field space and n(v) denotes the fuzzy field equivalent to the stored image.

Using this relationship, the connectivity can be expressed as:

$$C_{X^s} = conn(X^s, v, s) \quad \text{Equation 3}$$
$$= \max_{P(v,s)} [\min_{p \in P(v,s)} X^s(p)]$$
$$= 1 - \min_{P(v,s)} [\max_{p \in P(v,s)} |\eta(p) - \eta(s)|]$$

If $\eta(v)$ is the density, the density being expressed as a value in the interval [0, 1], of voxel v, then the definition of connectivity from a voxel v to a seed point s expressed by Equation 3 becomes:

$$C_{X^s} = conn(X^s, v, s) = 1 - \min_{P(v,s)} [\max_{p \in P(v,s)} |\text{density}(p) - \text{density}(s)|] \quad \text{Equation 4}$$

Equation 4 bases the connectivity purely on the changes in density of the image voxels and the connectedness to the seed point. Thus a voxel whose density is identical to the seed point and to which there is a direct path from the seed point, such as for example an Arterio-Venous Malformation (AVM), will have a very high membership value. However, where a voxel is remote from the seed point, the Applicants have recognized that the confidence level should be lower due to the path length from the seed point.

Accordingly to facilitate segmentation of such structures, it is desirable to be able to reduce the connectivity value of any voxel proportionately to its distance from the seed point along the path between them.

In order to take the path distance into account, the modified fuzzy field expressed in Equation 2, is modified so that it includes a function of the path distance from the seed point to the voxel. Equation 2 may be expressed as:

$$X^s = 1 - [|\eta(v) - \eta(s)| + \alpha \cdot \Lambda(v,s)] \text{clipped in } [0,1] \quad \text{Equation 5}$$

where $\alpha$ belongs to the interval [0,1] and $\alpha$ denotes the relative weight of the path distance in the equation and $\Lambda(v, s)$ denotes the path distance from voxel v to seed s, i.e. the number of voxels comprising the path.

Thus when considering modified fuzzy field expressed by Equation 5, the definition of connectivity expressed by Equation 3, becomes:

$$C_{X^s} = 1 - \min_{P(v,s)} [\max_{p \in P(v,s)} [|\text{density}(p) - \text{density}(s)| + \alpha \cdot \Lambda(p, s)]] \quad \text{Equation 6}$$

The connectivity C can thus be determined by obtaining at each voxel along a path the difference in the predetermined parameter, e.g. density, and combining this value with the function of the path length. The maximum combined values for a given path is selected and then the minimum of those values for the set of paths investigated between two points is selected for subtracting from unity so that the value is lowest when the measured values are highest.

Thus it will be seen that for two voxels with the same density, the connectivity of the one closest to the seed point will be greater.

To give the algorithm more flexibility, the user may set the value of $\alpha$ (i.e. the weighting given to the path distance) via the user interface 24. Accordingly, by setting $\alpha$ to 0, the connectivity expressed by Equation 6 becomes equivalent to Equation 3 and the algorithm functions without considering path distance. However, by increasing the value of $\alpha$, the effect of the relative densities is reduced and increasing importance is given to the path distance between voxel v and seed s.

Adjustment of the value of $\alpha$ can significantly improve the segmentation of the image, especially in the case of structures that exhibit a large density range and therefore require a lower confidence level in order to be displayed as part of the structure. An increase in the value of $\alpha$ will have the effect of lowering the connectivity value progressively from the seed point and therefore excluding remote structures whose densities are within the range exhibited by the structure. This enhances the segmentation of such structures which are connected.

Figure 4:
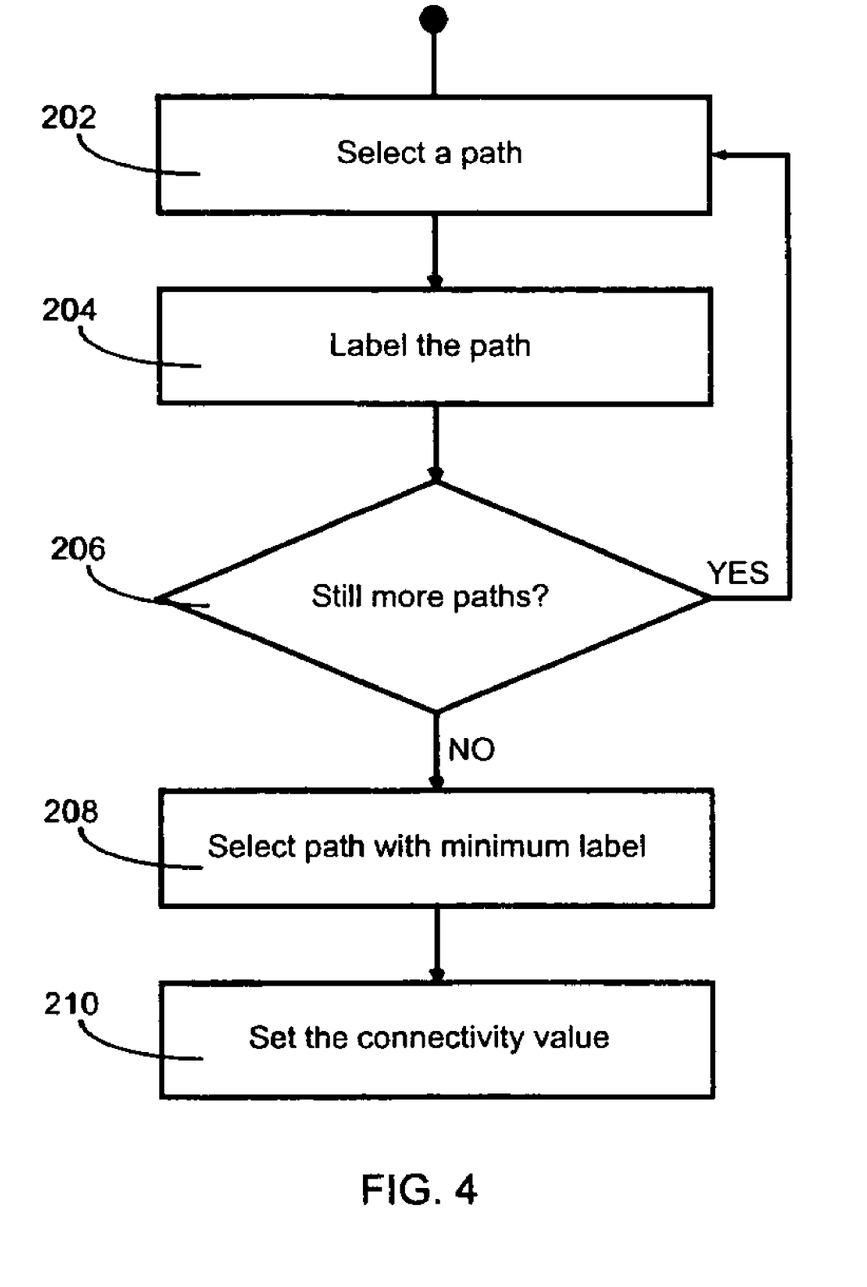
FIG. 4 illustrates a generalized flow chart of an algorithm to determine the connectivity of two voxels.

The algorithm to obtain the connectivity of a voxel to a seed point is depicted by the flow chart shown in FIG. 4. The sequence of steps composing the algorithm is indicated by the sequence of blocks 202 to 210. In block 202 the algorithm starts by selecting an unvisited path from the seed point to the voxel. The selection of a path may be performed by any suitable algorithm although the algorithm described by Dellepiane et al. in "Nonlinear Image Labeling for Multivalued Segmentation", IEEE Transactions on Image Processing, Vol. 5, No. 3, March 1996, pp. 429-446, has been found to be particularly useful.

At block 204, the algorithm labels the selected path with the maximum sum of the difference in density and weighted path distance between the voxel and the seed point for all voxels in the path. It uses the selected value of a in the computation to obtain the label. If the value of a is changed, the procedure is restarted.

At block 206 the algorithm determines whether all paths from the seed point to the voxel have been considered. If not the algorithm returns to block 202 in order to select another path. When all the paths have been visited the algorithm then proceeds to block 208 where the path with the minimum label value is selected. Finally, at block 210 the connectivity between the voxel and the seed point is set as 1.0 minus the label value of the selected path in block 208. It should be noted that the algorithm returns a connectivity value in the [0,1] interval but other scales may be used as well. For multiple seeds, block 204 may use, for example, the average density of the seed points, the density of the seed point with the density closest to the density of the voxel or the density of the seed point closest to the voxel. The algorithm depicted by blocks 202 to 210 produces an output array which is called the "connectivity map".

Figure 5:
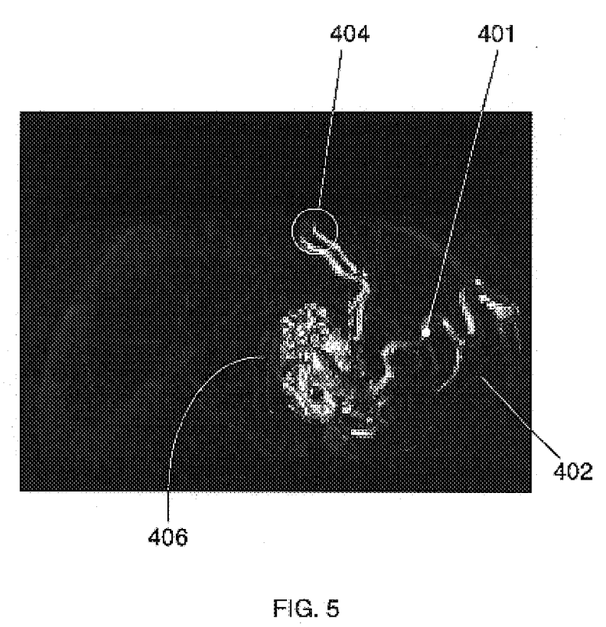
FIG. 5 illustrates the results of a segmentation algorithm applied to an MRA image using a first parameter.

FIG. 5 shows an image of an AVM in which the vessel structure identified by numeral 402 is to be segmented by selecting seed point 401 located in the center of the structure. However, since the AVM 406 and other related vessels such as vessel structure 404 have the same density as vessel structure 402, their connectivity values will be very high and thus remain associated with vessel structure 402. The effect of incorporating the distance function may be seen in FIGS. 6 and 7, where the connectivity function for the labeling step of block 204, as expressed by Equation 6, is used to compensate for the path distance from seed point 401.

Figure 6:
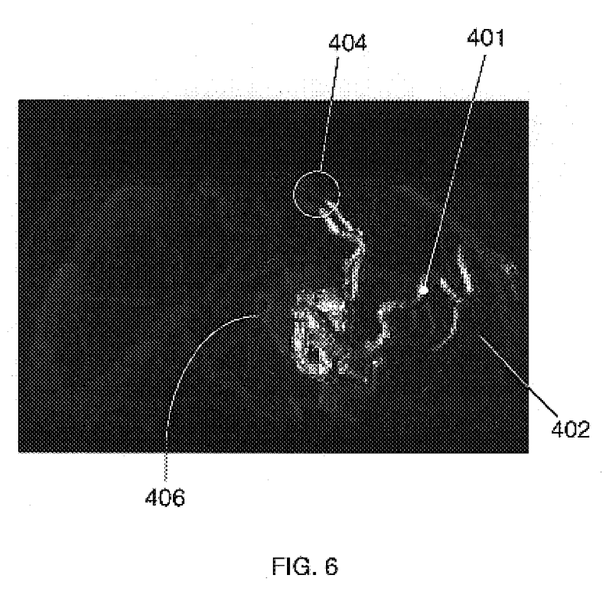
FIG. 6 illustrates the results of a segmentation algorithm applied to an MRA image using a second parameter.
Figure 7:
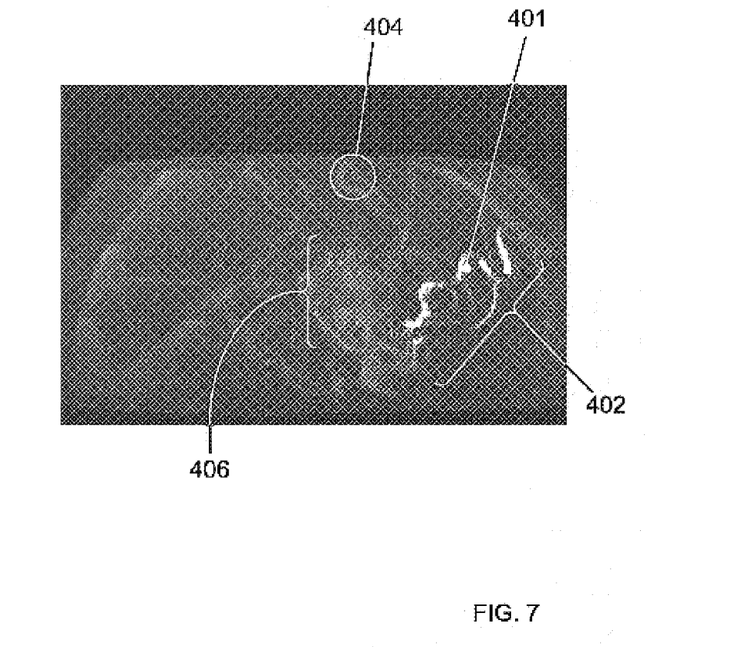
FIG. 7 illustrates the results of a segmentation algorithm applied to an MRA image using a third parameter.

FIGS. 6 and 7 illustrate the effect of different values of $\alpha$. In FIG. 6, a first increase in the value of $\alpha$ from that of FIG. 5 has the effect of diminishing of the connectivity value of vessel structure 404 and AVM 406. A further increase in the value of a is shown in FIG. 7 where the desired vessel 402 has been properly segmented. This results from the fact that Equation 6 causes voxels with the same density as seed point 401, but further away in the anatomical structure, to have lower connectivity values and, hence, exclude them from the segmentation as the threshold is adjusted.

Figure 8:
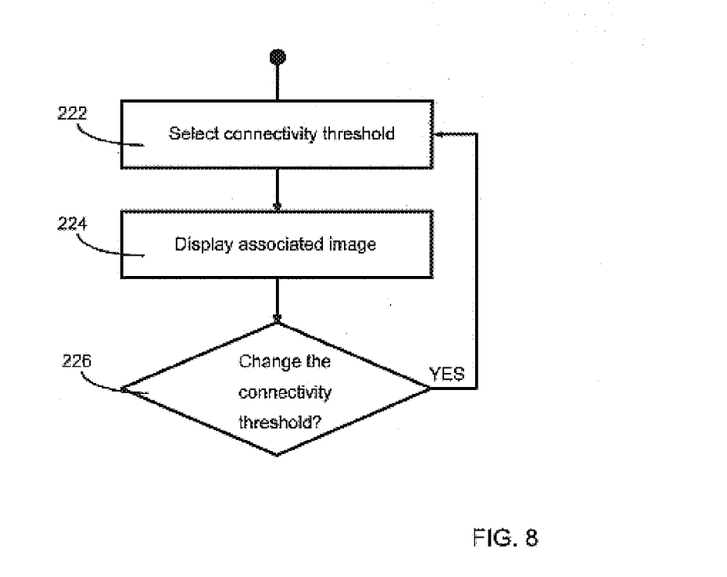
FIG. 8 illustrates a generalized flow chart of an algorithm the connectivity map browsing process.

The connectivity map resulting from the application of the algorithm described above represents not just one but a set of solutions, each with a different associated minimal level of confidence $C_{X^s}$. As the value of connectedness is varied, so the number of voxels included in the image will vary to permit refinement of the image or display 26. Using the connectivity map, the user can easily browse through the set of solutions using display 26 and, using user interface 24, select the one that best describes the desired anatomical region. In FIG. 8 there is shown a flow chart that depicts the browsing process steps. The sequences of steps performed is indicated by the sequence of blocks 222 to 226. In block 222 the user sets the connectivity threshold value via user interface 24 and in block 224 the voxels satisfying the criteria are retrieved from the database and the resultant image is displayed on display 26. In block 226 the user analyses the image displayed at block 224 decides if it is satisfactory. If the image is not satisfactory, the user returns to block 222 and selects a new connectivity threshold value.

Figure 9:
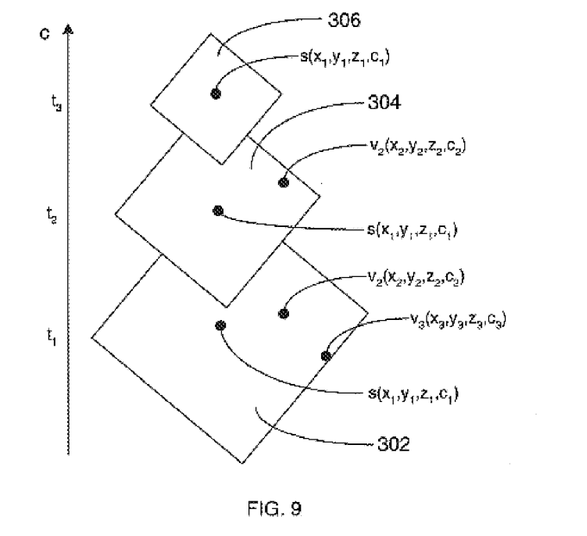
FIG. 9 is a schematic diagram depicting three different segmentation solutions, each representing a set of voxels having a predetermined minimal connectivity value.

By increasing the threshold, the user removes irrelevant structures and refines the anatomical structure where the seed point was planted. The labels of connectedness applied to the voxel are used as the different images are browsed. As can be seen in FIG. 9, numerals 302 to 306 represent three different solutions, each can be viewed as a set of voxels having a predetermined minimal connectivity value. For an initial connectivity threshold value $t_1$ such that $t_1$ is lesser than $c_1$, $c_2$ and $C_3$, the solution set would be the voxels represented by numeral 302. As the connectivity threshold value increases, the solution space shrinks. By setting the threshold to $t_2$, such that $t_2$ is now greater than $C_3$ but still lesser than $c_1$ and $c_2$, voxel $V_3$, having a connectivity value $C_3$ lower than the threshold, is no longer part of the solution set now represented by numeral 304. Further still, by setting $t_3$ such that $t_3$ is greater than both $C_3$ and $c_2$ but still lesser than $c_1$, voxel $v_2$, having a connectivity value $c_2$ lower than the threshold, is no longer part of the new solution set now represented by numeral 306.

Figure 10:
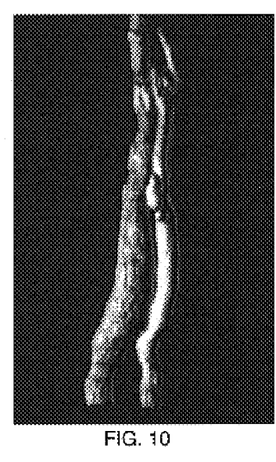
FIG. 10 illustrates the effect of the rising threshold value on the segmentation solutions of an MRA image.
Figure 11:
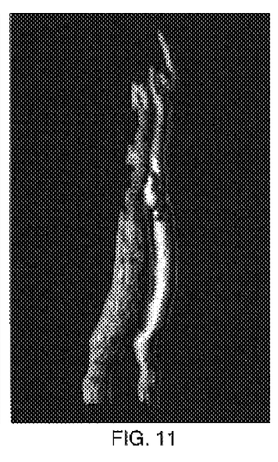
FIG. 11 illustrates the effect of the rising threshold value on the segmentation solutions of an MRA image.
Figure 12:
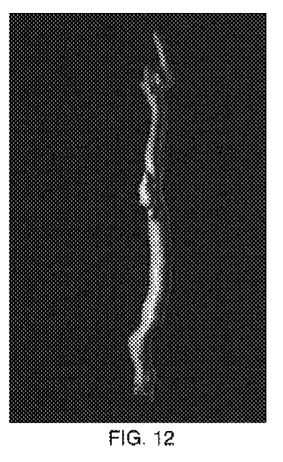
FIG. 12 illustrates the effect of the rising threshold value on the segmentation solutions of an MRA image.

FIGS. 10, 11 and 12 show the effect of the rising threshold value on the three-dimensional images corresponding to solution sets 302, 304 and 306 respectively. As will be noted, as the threshold is increased, the segmentation is enhanced.

The weighting of the connectedness with the distance function may be utilized with additional image enhancing techniques by optionally letting the user, using user interface 24, embed knowledge of the structure that he or she wishes to segment.

Contrast Table

To improve the accuracy and speed of segmentation, a lookup table can be used to enhance the differences between the anatomical structures under investigation and the rest of the anatomy. The lookup table maps or assigns contrast values to certain densities, range of densities or areas. The segmentation process will then operate on the image once it has been remapped using the contrast values in the look up table. The connectivity expressed by Equation 6 will then be calculated as follows:

$$C_X{}^s = 1 - \min_{P(v,s)}[\max_{p \in P(v,s)}[|density'(p) - density'(s)| + \alpha \cdot \Lambda(p,s)]] \quad \text{Equation 7}$$

where density'(v)=lookup table [density(v)].

Figure 13:
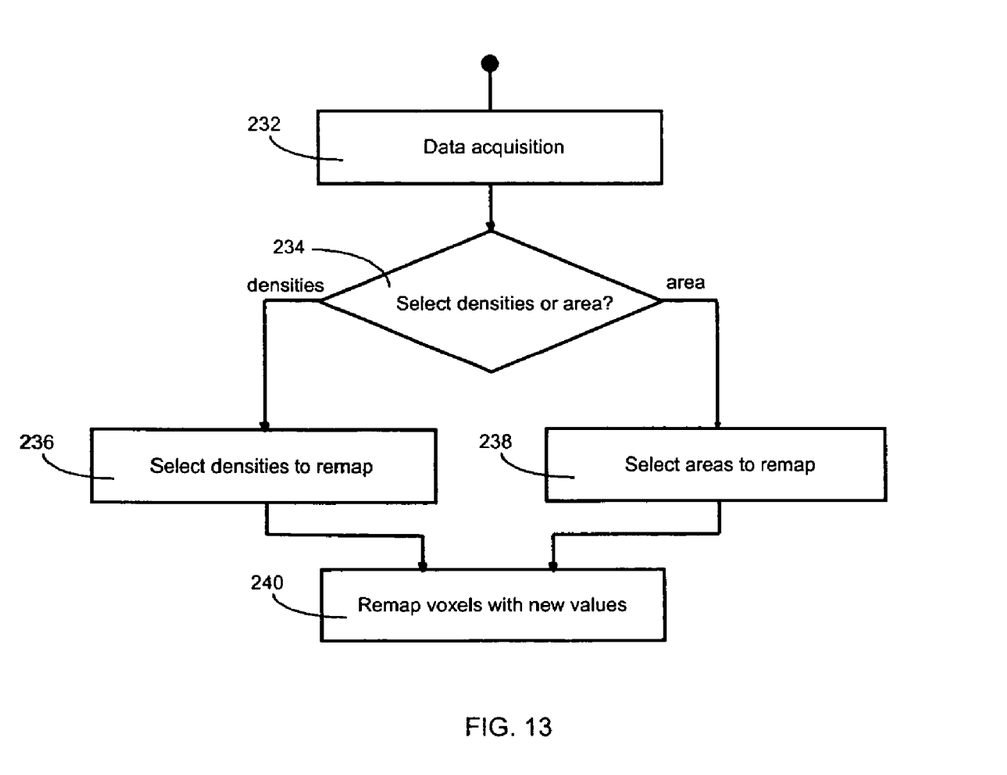
FIG. 13 illustrates a generalized flow chart of an algorithm the contrast table setting and remapping process.

In FIG. 13 there is shown a flow chart that depicts the lookup table setting and remapping process steps. The sequences of steps performed is indicated by the sequence of blocks 232 to 240. In block 232, the process inputs data-set 28 for processing. At block 234 the user has the option to create, using user interface 24, a lookup table by inputting specific density values or by selecting a specific areas. At block 236, if that option is selected, the user inputs, using user interface 24, specific density values that are to be remapped to a predetermined density. Densities within the range selected are thus remapped to the predetermined value at block 240 and then processed for segmentation and display as shown above.

Alternatively, at block 238, if that option is selected, the user selects, using user interface 24, specific areas of the image represented by data-set 28 whose voxels densities are to be remapped to a common value. Finally, at block 240, all voxels selected at block 238 have their density value remapped to the common value that typically may be zero (background). It should be noted that block 240 may be modified to assign different values than zero if so desired.

There are several ways in which the algorithm can take advantage of this functionality, mainly in reducing the noise in the image and increasing the accuracy of the segmentation by eliminating densities that are not part of the anatomy under investigation, i.e. outside a range of values of interest. For example, in a CTA dataset, the liver does not contain any densities that are as high as the density of bone; hence the bone's density can be remapped to zero (background) and excluded from the segmentation. Another advantage is in limiting user mistakes. If the user places a seed point in a region which is considered background, then the seed point will be ignored. For example, if the user is intent on segmenting the liver in a CTA dataset, a seed point placed on the bone will not be considered. It should be noted that the remapping of densities through the use of the lookup table in the algorithm is optional. If a table is not used, the algorithm will operate on the original density values.

A significant benefit of the use of the lookup table is that it can integrate the segmentation with the visualization process, specifically using an opacity table typically used for the Volume Rendering. This approach brings several benefits as there are already several algorithm/workflow options for setting optimal values. Moreover it orientates the segmentation to the view.

Using this technique, similar density in the image can be remapped as one, and this can improve the segmentation in some situations.

This technique is very powerful when used with the distance function as the actual vessel to follow can contain several densities, which the contrast table (opacity) will remap as one. The seed point being inside the vessel will have the same intensity as well. So for a voxel inside the vessel equation became:

$$C_x = 1 - \min_{P(s,v)} \alpha (\max_{p \in P(s,v)} (\cdot \Lambda(p,s))) = > 1 - \alpha \min_{P(s,v)} \Lambda(v,s)(*)$$

Since $\max_{p \in P(s,v)} \cdot (\Lambda(p,s)) = \Lambda(p,s) =$ number of steps from s to p.

Figure 14:
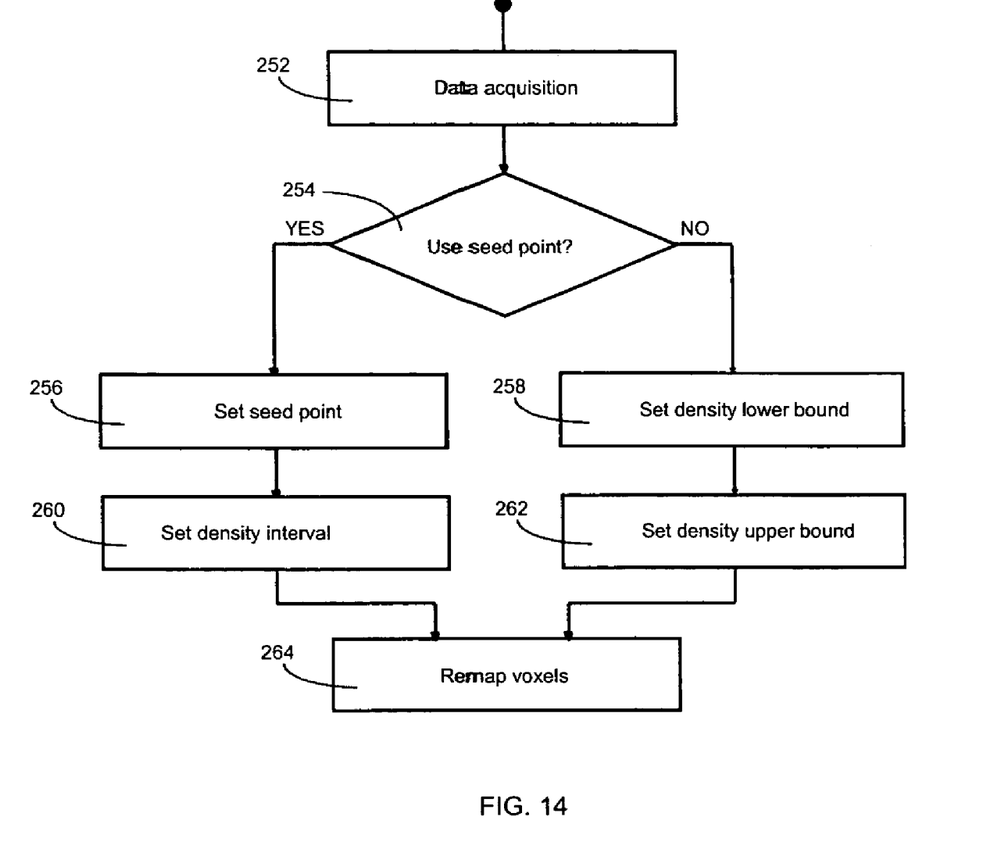
FIG. 14 illustrates a generalized flow chart of an algorithm the density range setting and remapping process

With (*) it is clear that $\alpha$ represents the length along the minimal path that makes the membership decrease by 1 and so it can be used to measure the length of the vessel. So in other terms if from voxel V to seed point S there are N difference in membership value, it means that the distance along the vessel is N/$\alpha$ Density Range To further improve the accuracy and speed of segmentation, a density range can be used to limit the range of densities to be considered by the algorithm. The segmentation process will then operate on the image once it has been remapped by excluding all densities that are not in the selected range. The user may set the density range by either specifying the specific densities or, in a more interactive way, by selecting a seed point and specifying predefined limits for display relative to the seed point, i.e. the number of densities to be considered above and below the seed point's density value. In FIG. 14 there is shown a flow chart that depicts the density range setting and remapping process steps. The sequences of steps performed is indicated by the sequence of blocks 252 to 264. In block 252 the process inputs data-set 28 for processing. At block 254 the user has the option to set the range of densities to be excluded by the algorithm, using user interface 24, by way of a seed point or by inputting a specific density range. At block 256, if that option is selected, the user selects a seed point, using user interface 24, who's density value will become the center of a density range, the extent of that range is specified by the user, using user interface 24, at block 260. At block 258, if that option is selected, the user specifies the density range, using user interface 24, by setting the lower bound value of the range and then, at block 262, the upper bound. Finally, at block 264, all voxels having a density outside the density range specified have their density value remapped to zero (background). It should be noted that block 240 may be modified to assign different values than zero if so desired.

Volume Size

Figure 15:
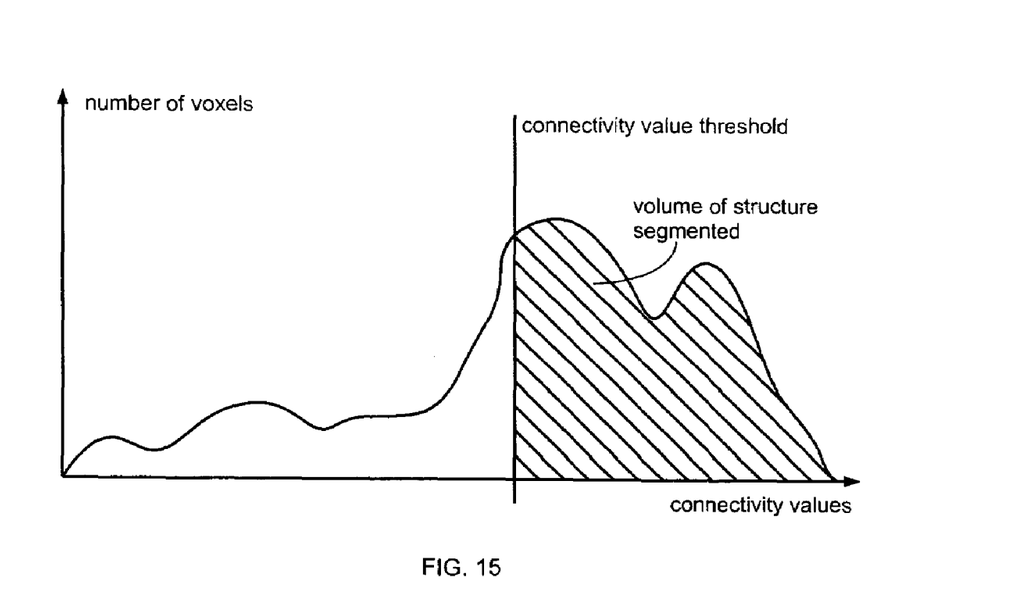
FIG. 15 shows a histogram of the volume of a segmented structure in function of the connectivity threshold value.

To still further improve the accuracy and speed of segmentation, an expected number of data points can be set to limit the size of any solution set generated by the algorithm. For example, for a 3-D image, the volume size of a structure (i.e. number of voxels) can be used to guide the segmentation. The volume size of the object can be measured simply by querying the histogram, as shown in FIG. 15, of the connectivity map and calculating the area under the curve for all the values from the threshold to the maximum connectivity value. Since there is a direct relationship between the threshold and the volume of the structure, the algorithm can automatically determine the optimal threshold to extract the structure with the specified volume by starting at a high value threshold, computing how many voxels there are that have a connectivity value higher than the threshold and lowering the threshold until the number of voxels with a connectivity value higher than the threshold corresponds to the expected volume size.

Figure 16:
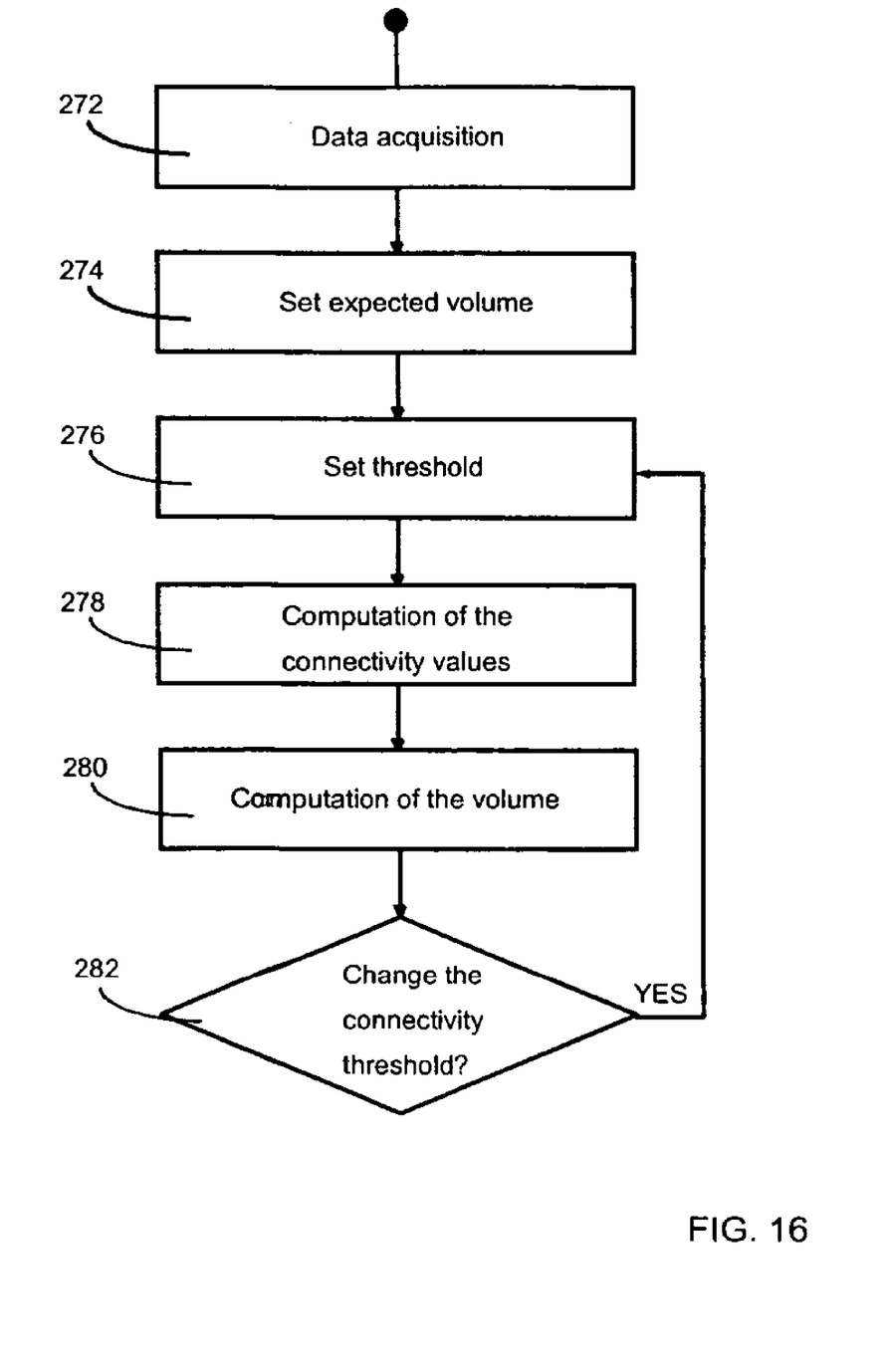
FIG. 16 illustrates a generalized flow chart of an algorithm the automatic threshold setting process

In FIG. 16 there is shown a flow chart that depicts the automatic threshold setting process steps. The sequences of steps performed is indicated by the sequence of blocks 272 to 282. In block 272 the process inputs data-set 25 for processing. At block 274 the user sets, using user interface 24, the expected volume of the structure under consideration and at block 276 the connectivity threshold. At block 278 the connectivity level of the voxels is computed, using the algorithm shown in FIG. 4, then in block 280 the volume is computed by calculating the number of voxels which have a connectivity level above the set threshold. Finally, at block 282, computed volume and expected volume are compared to see if they are equal, if the computed volume is bigger, then at block 276 the threshold is set to a higher value but if the computed volume is smaller, then at block 276 the block is set to a lower value. It should be noted that instead of comparing to see if the computed and expected volumes are equal, they could be compared to see if their difference is within a certain acceptable margin.

Figure 17:
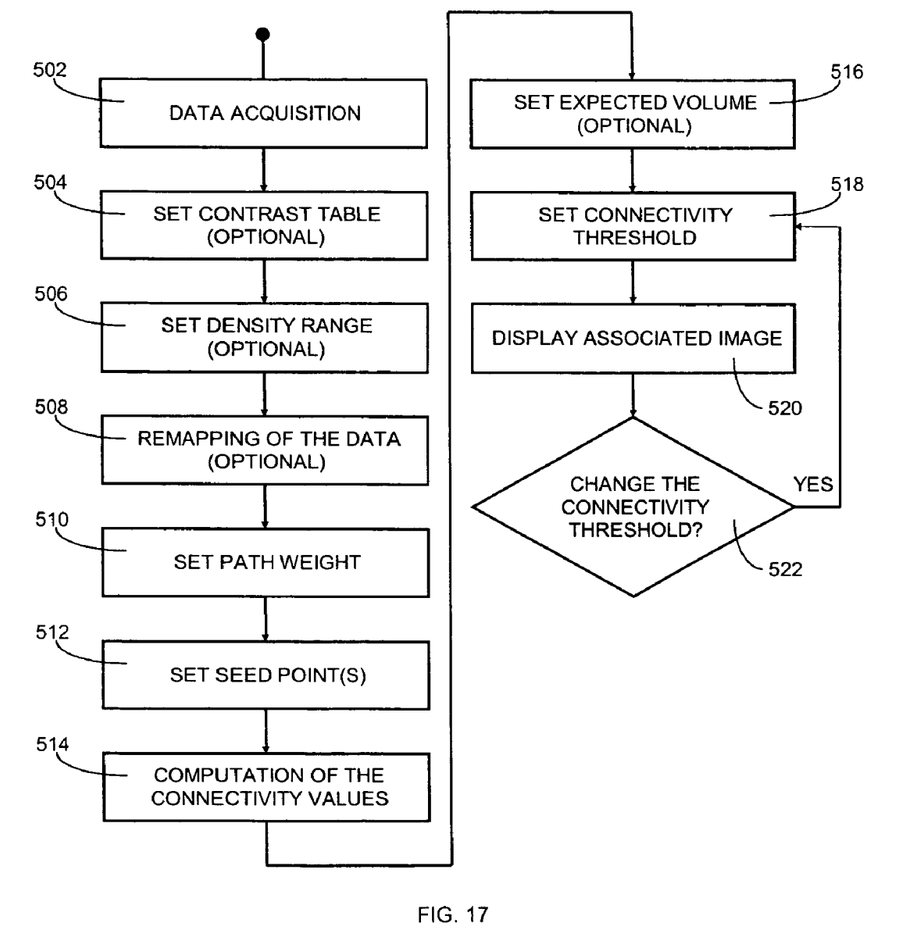
FIG. 17 illustrates a generalized flow chart of an algorithm the image segmentation algorithm according to the present invention.

In FIG. 17 there is shown a flow chart that depicts the operation of the program 30, for controlling the computer 20, incorporating the above-described improvements. The sequence of steps performed by the program is indicated by the sequence of blocks 502 to 522. In block 502 the program inputs a data-set 28 for processing.

At block 504, the user has the option to set, using user interface 24, a contrast table to allow the elimination of unwanted structures and/or densities.

At block 506, the user has the option to set, using still user interface 24, a density range in order to limit the range of densities to be considered.

At block 508, if the user has set any contrast table or density range, the program 30 remaps the data-set 28 in accordance with the set values.

At block 510, the user sets, using still user interface 24, the path weight that will be used by block 514 for the computation of the connectivity values.

At block 512, the user sets, using still user interface 24, the seed point or points that will be used by block 514 for the computation of the connectivity values.

At block 514, the program 30 computes the connectivity values according to Equation 6 in accordance with the path weight value set at block 510. It should be noted that Equation 6 is performed on the modified data-set, meaning the output of block 508.

At block 516, the user has the option to set, using the user interface 24, an expected volume in order to automatically compute the optimal threshold.

At block 518, the user sets, using still user interface 24, the threshold representing the lowest connectivity value to be considered. It should be noted that if the user has set an expected volume at block 516, an optimal threshold value will have already been selected, though the user can still modify that value if so desired.

At block 520, the program 30 uses display 26 to show the user the structure associated with the selected threshold.

At block 522, the user, analyzing display 26, evaluates if the desired structure is displayed, if not, the user may return to block 518 to set a new threshold value to further expand or shrink the displayed structure.

Although the present invention has been described by way of a particular embodiment thereof, it should be noted that modifications may be applied to the present particular embodiment without departing from the scope of the present invention and remain within the scope of the appended claims.

What is claimed is:

1. A method of segmenting a structure from a dataset stored as a set of spatially related data points said method comprising: using processor to perform the steps of:
    a) obtaining said dataset from a database;
    b) enabling selection of a seed point within a desired structure to be segmented from said dataset;
    c) for each data point in said dataset:
        i) determining a path from said seed point to said data point;
        ii) examining variations in a predetermined characteristic of other data points along said path; and
        iii) defining a confidence level representing connectivity from a respective data point to said seed point based on a function of said variations in said predetermined characteristic and a distance from said seed point along said path;
    d) determining if additional paths exist between said seed point and said data point and, if so, repeating step c) and selecting a path with a highest confidence level; and
    e) segmenting said structure by selecting data points with a required confidence level that said data points selected belong to the same structure as said seed point.

2. A method according to claim 1 wherein the length of said path is combined with said function employing variations of said parameter to obtain said value of connectivity.

3. A method according to claim 2 wherein a value of said predetermined parameter is mapped to a table to assign one of a plurality of values thereto and said evaluation of variation of said parameter is evaluated on the basis of values obtained from said table.

4. A method according to claim 2 wherein values of said predetermined parameter are compared to a predefined range of values and those outside said range modified.

5. A method according to claim 4 wherein said values are modified by reducing said values to zero.

6. A method according to claim 2 wherein an area of said image is selected and values of said predetermined parameter in said area are modified.

7. A method according to claim 6 wherein said values are modified by reducing said values to zero.

8. A method according to claim 2 wherein values of said predetermined characteristic are exceeding said threshold are changed to a common value.

9. A method according to claim 2 wherein values of said predetermined parameters are compared to said seed point and those within predefined limits of that of said seed point are selected for further processing.

10. A method according to claim 1 wherein a weighting factor is applied to said length of said path to vary the effect of said distance and said value of connectivity.

11. A method according to claim 10 wherein said weighting factor is variable.

12. A method according to claim 1 wherein said required confidence establishes a threshold value for said connectivity and is adjustable to vary the data points selected for display.

13. A method according to claim 1 wherein said function employing variations in said parameter is an indication of the maximum variation in said parameter.

14. A method according to claim 1 wherein a plurality of paths are evaluated and limited by application of a volume size value.

15. A method according to claim 1 wherein the number of the selected data points is compared to an anticipated value.

16. A method according to claim 15 wherein a threshold for said required confidence is adjusted to bring said number of selected data points into conformity with said anticipated value.

17. A method according to claim 15 wherein said set of selected data points represents a volume of a structure.

18. A method according to claim 1 wherein said seed point is selected from a set of data points other than those being segmented.

19. A method according to claim 18 wherein said seed point is selected based upon characteristics in said data set indicative of a particular feature.

20. A method according to claim 1 wherein said seed point is selected from examination of a set of data points to identify a characteristic indicative of a particular feature.

21. A computer readable medium comprising computer executable instructions that when executed cause a computing device to:
   a) obtain said dataset from a database;
   b) enable selection of a seed point within a desired structure to be segmented from said dataset;
   c) for each data point in said dataset;
      i) determine a path from said seed point to said data point;
      ii) examine variations in a predetermined characteristic of other data points along said path; and
      iii) define a confidence level representing connectivity from a respective data point to said seed point based on a function of said variations in said predetermined characteristic and a distance from said seed point along said path;
   d) determining if additional paths exist between said seed point and said data point and, if so, repeating step c) and select a path with a highest confidence level; and
   e) segment said structure by selecting data points with a required confidence level that said data points selected belong to the same structure as said seed point.

22. The computer readable medium according to claim 21 wherein the length of said path is combined with said function employing variations of said parameter to obtain said value of connectivity.

23. The computer readable medium according to claim 22 wherein a value of said predetermined parameter is mapped to a table to assign one of a plurality of values thereto and said evaluation of variation of said parameter is evaluated on the basis of values obtained from said table.

24. The computer readable medium according to claim 22 wherein values of said predetermined parameters are compared to said seed point and those within predefined limits of that of said seed point are selected for further processing.

25. The computer readable medium according to claim 21 wherein a weighting factor is applied to said length of said path to vary the effect of said distance and said value of connectivity.

26. The computer readable medium according to claim 21 wherein said required confidence establishes a threshold value for said connectivity and is adjustable to vary the data points selected for display.

27. The computer readable medium according to claim 21 wherein said seed point is selected from examination of a set of data points to identify a characteristic indicative of a particular feature.

28. A method of establishing a threshold value for segmenting an image of a structure stored as a set of spatially related data points representing variations in a predetermined parameter, said method comprising: using processor to perform the steps of :establishing a first number of data points expected to represent a segmented feature of said image; establishing said threshold value of a characteristic of said data set; determining a second number of data points meeting said threshold; comparing said first and second number of data points; and adjusting said threshold if said first and second numbers do not correlate.

29. A method according to claim 28 wherein said threshold is adjusted until said first and second numbers substantially correspond to each other.

30. A computer readable medium comprising computer executable instructions that when executed cause a computing device to perform the method according to claim 28.

* * * * *

UNITED STATES PATENT AND TRADEMARK OFFICE
CERTIFICATE OF CORRECTION

PATENT NO.         : 7,596,267 B2
APPLICATION NO.    : 10/788481
DATED              : September 29, 2009
INVENTOR(S)        : Accomazzi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1174 days.

Signed and Sealed this

Fourteenth Day of December, 2010

David J. Kappos
*Director of the United States Patent and Trademark Office*